(12) United States Patent
Webster et al.

(10) Patent No.: US 6,449,493 B1
(45) Date of Patent: Sep. 10, 2002

(54) PORTABLE OR MOBILE RADIO

(75) Inventors: Pauline Webster, Old Basing; David Jeffreys, Tadley; Christopher Phillips, Camberley; Patrick Conduit, Reading, all of (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/558,790

(22) Filed: Apr. 26, 2000

(30) Foreign Application Priority Data

May 1, 1999 (GB) ............................................. 9910066

(51) Int. Cl.[7] .............................. H04B 1/38; H04M 1/00
(52) U.S. Cl. ........................ 455/550; 455/551; 455/564
(58) Field of Search ................................. 455/432, 433, 455/550, 551, 558, 426, 563, 564; 379/39, 40, 41

(56) References Cited

U.S. PATENT DOCUMENTS

| | | | | |
|---|---|---|---|---|
| 5,249,220 A | * | 9/1993 | Moskowitz et al. | 379/93 |
| 5,901,365 A | * | 5/1999 | Yasuda et al. | 455/564 |
| 6,075,983 A | * | 6/2000 | Kumagai | 455/410 |
| 6,125,287 A | * | 9/2000 | Cushman et al. | 455/566 |
| 6,223,057 B1 | * | 4/2001 | Sone | 455/564 |
| 6,393,304 B1 | * | 5/2002 | Meche | 455/563 |

FOREIGN PATENT DOCUMENTS

| | | | | |
|---|---|---|---|---|
| EP | 0 554 180 A2 | 8/1993 | | |
| GB | 2 317 073 A | 3/1998 | | |
| GB | 2 317 317 073 A | * 11/1998 | ............ | H04Q/7/32 |
| GB | 2 337 183 A | 11/1999 | | |

* cited by examiner

*Primary Examiner*—Thanh Congle
*Assistant Examiner*—Tuan Tran
(74) *Attorney, Agent, or Firm*—Steven R. Santema

(57) ABSTRACT

A portable or a mobile radio (2) can communicate with other such radios (4,6), and can place calls to telephone subscribers. A permanent memory (32) in the radio (2) serves as an address book. A user interface circuit (42,44) enables a user to send pre-stored messages to radios whose addresses are also pre-stored. Other regions of the permanent memory (32) store an access code which can be used to make a DTMF telephone call. The telephone calls can be 'live dial', but may be made automatically to pre-stored telephone numbers.

10 Claims, 2 Drawing Sheets

| ADDRESS BOOK ENTRY NUMBER | ADDRESSES | 5-TONE TELEGRAM ID | ALIAS |
|---|---|---|---|
| 1 | 12 | 1 | PAULINE (HEATHROW) |
| 2 | N/A | 2 | DTMF ACCESS |
| 3 | 12 | 3 | PAULINE (GATWICK) |
| 4 | 12 | 4 | PAULINE DTMF (BUFFERED) |
| 5 | 89 | 4 | |

| 5-TONE TELEGRAM ID | TELEGRAM SPEC | TYPE |
|---|---|---|
| 1 | $125A_1A_2$ | 5-TONE |
| 2 | 12345 | DTMF (LIVE DIAL) |
| 3 | $543A_1A_2$ | 5-TONE |
| 4 | 12345__ | DTMF (BUFFERED DIAL) |

*FIG. 3*

| ADDRESS BOOK ENTRY NUMBER | ADDRESSES | 5-TONE TELEGRAM ID | ALIAS |
|---|---|---|---|
| 1 | 12 | 1 | PAULINE (HEATHROW) |
| 2 | N/A | 2 | DTMF ACCESS |
| 3 | 12 | 3 | PAULINE (GATWICK) |
| 4 | 12 | 4 | PAULINE DTMF (BUFFERED) |
| 5 | 89 | 4 | |

*FIG. 4*

PORTABLE OR MOBILE RADIO

TECHNICAL FIELD

The present invention relates to the field of radio communication systems. In particular, the present invention relates to portable and/or mobile radios.

BACKGROUND

Portable and mobile radios are normally arranged to communicate with one another through a base station. The radios and the base station are referred to as a Personal Mobile Radio (PMR) system. Several base stations may be linked together to form a network. A radio can therefore communicate with any other radio which is within communication range of one of the base stations of the network.

Some PMR radios are capable of communicating with other radios directly, without the communication passing through a base station. This mode of operation is referred to as Direct Mode Operation.

FIG. 1 illustrates the general scheme of a PMR radio system 10. Portable radios 2, 4 and 6 of FIG. 1 can communicate with a base station 8. Radios 2, 4 and 6 could equally well be mobile radios mounted in vehicles. Each of the radios shown in FIG. 1 can communicate through base station 8 with one or more other radios. If radios 2, 4 and 6 are capable of direct mode operation, then they may communicate directly with one another or with other radios, without the communication link passing through base station 8.

Portable and mobile radios are also known which can place calls to telephone subscribers. These calls may be from the radio to either a 'POTS' landline telephone, or a mobile telephone.

There are therefore various communications options available to the operator of a portable or mobile radio.

There is a need to make operation of the portable or mobile radio simple. This, for example, reduces the time required for a user to set up a call to another radio or a telephone subscriber. This may be of particular advantage to public safety users of portable or mobile radios.

Simplification of the actions to be carried out by the user also reduces the user's likelihood of making mistakes. Finally, this simplification also saves money for users of radio systems, since it reduces the amount of training which must be provided to users of the radios.

BRIEF DESCRIPTION OF THE DRAWINGS

FIG. 3 illustrates the contents of part of the permanent memory of a radio in accordance with the present invention.

FIG. 4 illustrates the contents of another part of the permanent memory of a radio in accordance with the present invention.

DETAILED DESCRIPTION OF THE PREFERRED EMBODIMENT

A mobile or a portable radio in accordance with the invention comprises: a controller; user interface circuitry, at least a portion of the user interface circuitry being activatable by the user; a permanent memory adapted to function as an address book, the permanent memory comprising:

(i) one or more first regions, each first region for storing a predetermined message for transmission by the radio and a pointer value unique to that first region, whereby the message stored in any particular first region is retrievable by selecting the pointer value for that particular first region;

(ii) a second region, the second region storing a DTMF access code and a pointer value unique to the second region, whereby the DTMF access code is retrievable by selecting the pointer value unique to the second region;

(iii) one or more third regions, each third region for storing the address of another mobile or portable radio and a pointer value of one of the first regions, each third region of the permanent memory being accessible to a user of the mobile or portable radio by activation of the user interface circuitry;

(iv) a fourth region, the fourth region storing the pointer value of the second region, the fourth region of the permanent memory being accessible to a user of the mobile or portable radio by activation of the user interface circuitry;

the controller being adapted to perform the following functions:

(i) in response to the user selecting one of the third regions of the permanent memory, the controller retrieves the predetermined message from the particular first region indicated by the pointer value stored in the selected third region, and the controller causes the radio to send the retrieved message to the mobile or portable radio identified by the address stored in the selected third region; and (ii) in response to the user selecting the fourth region of the permanent memory, the controller retrieves the DTMF access code from the second region of the permanent memory, and the controller causes the radio to transmit the DTMF access code to access a DTMF telephone system.

Further preferred embodiments of the invention are described in the appended dependent claims. In particular, the radio may be further adapted to dial pre-stored telephone numbers automatically, using fifth and sixth regions of the permanent memory.

In operation, the mobile or portable radio of the invention is particularly simple to use. The radio can therefore be used quickly and accurately to place a call, and the training time required for use of the radio is low.

Figure 1:
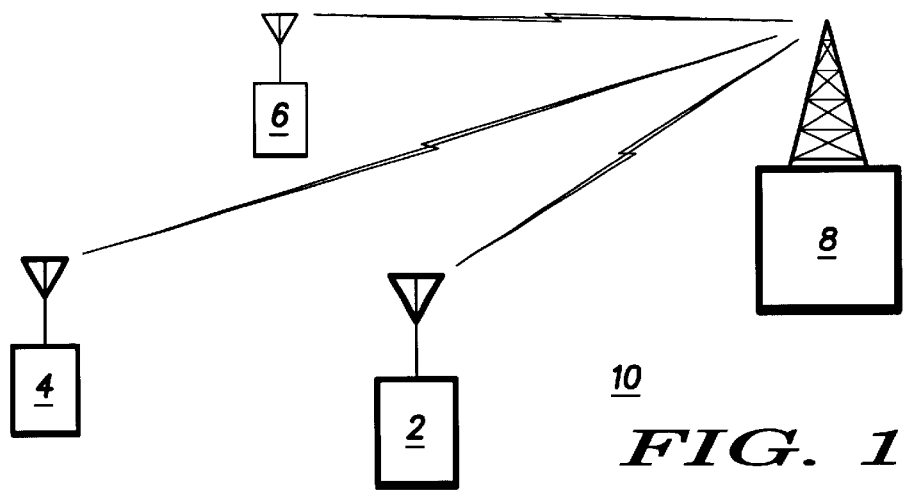
FIG. 1 illustrates an arrangement of portable and/or mobile radios and a base station.
Figure 2:
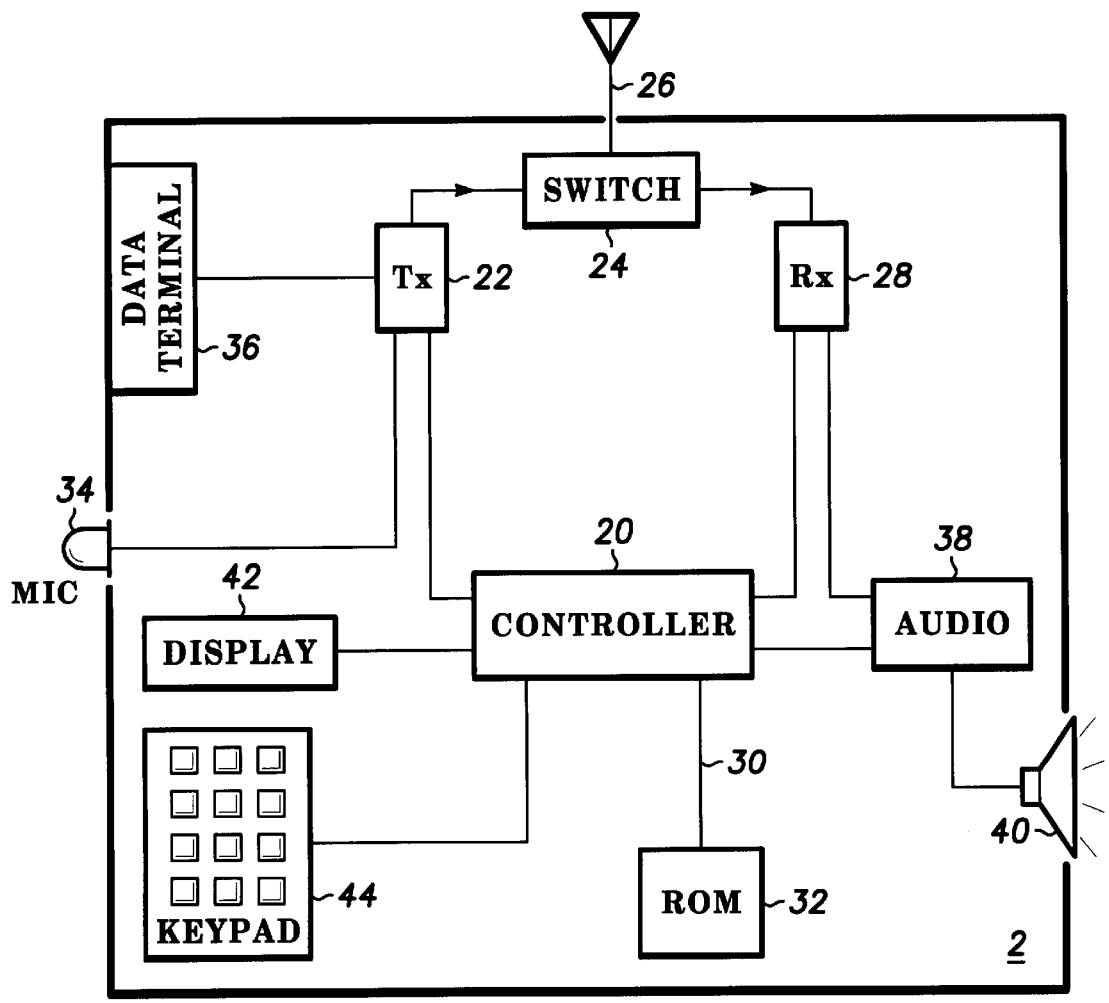
FIG. 2 illustrates a portable- or a mobile radio in accordance with the present invention.

FIG. 2 illustrates a radio in accordance with the present invention. The radio of FIG. 2 may be either a portable- or a mobile radio.

The radio 2 of FIG. 2 can transmit speech from a user of the radio. The radio comprises a microphone 34 which provides a signal for transmission by the radio. The signal from the microphone is transmitted by transmission circuit 22.

Transmission circuit 22 transmits via switch 24 and antenna 26. The transmitter 2 also has a controller 20 and a read only memory (ROM) 32. Controller 20 may be a microprocessor. ROM 32 is a permanent memory, and may be a non-volatile Electrically Erasable Programmable.

Read Only Memory (EEPROM). ROM 32 contains various different regions of memory, which are explained below in connection with FIGS. 3 and 4.

The radio 2 of FIG. 2 also comprises a display 42 and keypad 44, which serve as part of the user interface circuitry of the radio. At least the keypad 44 portion of the user interface circuitry is activatable by the user. Voice activation of the radio, or other means of interaction with a user, may also be employed.

Signals received by the radio are routed by the switch to receiving circuitry 28. From there, the received signals are routed to controller 20 and audio processing circuitry 38. A loudspeaker 40 is connected to audio circuit 38. Loudspeaker 40 forms a further part of the user interface.

A data terminal 36 may be provided. Terminal 36 would provide a signal comprising data for transmission by transmitter circuit 22, switch 24 and antenna 26.

In the radio of the invention, the permanent memory 32 of radio 2 is adapted to function as an address book. The permanent memory comprises four different types of region. These are explained below, with reference to FIGS. 3 and 4.

Briefly, the central column of FIG. 3 shows examples of standard predetermined messages held in the permanent memory of the radio. These predetermined messages are designed to be transmitted by the radio.

The left column of FIG. 3 shows examples of 'pointers' held in the permanent memory. Each predetermined message in the centre column of FIG. 3 is held in a region of the permanent memory together with the pointer shown on the same row of the FIG.

The right column of FIG. 3 is shown for illustrative purposes only. The entry in the right column is a brief explanation of the type of message shown on that row of the FIG.

FIG. 3 illustrates the first two kinds of region of permanent memory in accordance with the present invention.

In accordance with the invention, there are one or more first regions of the permanent memory, each first region suitable for storing a predetermined message for transmission by the radio and a pointer value unique to that first region. In FIG. 3 the rows with pointers 1 and 3 are examples of these first regions. Message '125' in the row with pointer 1 is a predetermined message for a radio at Heathrow airport. This is made more clear in connection with FIG. 4. Message '543' in the row with pointer 3 is a predetermined message for a radio at Gatwick airport.

The message stored in any particular first region is retrievable by selecting the pointer value for that particular first region. Therefore the message '125' is retrievable by using the pointer value 1 shown in FIG. 3, for example.

In accordance with the invention, there is also a second kind of region of permanent memory 32. The second region stores a DTMF access code and a pointer value unique to the second region. The DTMF access code is stored in the region having the pointer value 2, in the example shown in FIG. 3. The DTMF access code is retrievable by selecting the pointer value 2, which is unique to the second region.

FIG. 4 shows a further part of the permanent memory 32 in accordance with the invention. FIG. 4 shows two examples of a third kind of region, each third region storing the address of another mobile or portable radio and a pointer value of one of the first regions. In the example of FIG. 4, the row with 'address book entry' number 1 has the pointer value 1 in its third column, and address '12' in the second column. The row with address number 3 has the pointer value 3 in its third column, and address '12' in the second column. Each third region of the permanent memory is accessible to a user of the mobile or portable radio by activation of the user interface circuitry.

The fourth column of FIG. 4 is shown for illustrative purposes only, and the meaning of the entries in this column will become clearer below.

The permanent memory of the invention also comprises a fourth kind of region, the fourth region storing the pointer value of the second region explained in connection with FIG. 3. The fourth region is shown in FIG. 2 as having address book entry number 2. The fourth region of the permanent memory is accessible to a user of the mobile or portable radio by activation of the user interface circuitry.

In accordance with the present invention, the radio's controller is adapted to perform the following functions:

1) In response to the user selecting one of the third regions of the permanent memory, the controller retrieves the predetermined message from the particular first region indicated by the pointer value stored in the selected third region, and the controller causes the radio to send the retrieved message to the mobile or portable radio identified by the address stored in the selected third region.

Looking at FIG. 4, assume for example that a user selects address book entry number 1. The controller uses the pointer value 1 of that entry to retrieve the message '125A$_1$A$_2$'. The controller then sends message 125 with the address found at address book entry number 1 in FIG. 3, i.e. address 12. The two letters 'A$_1$A$_2$' in the message are variables signifying the address to which the message is to be sent.

The result of this action is that the radio of the invention sends a message to contact Pauline at Heathrow, as shown in the final column of FIG. 4. Had the user selected address book entry number 3 in FIG. 4, then the message would have been to contact Pauline at Gatwick.

2) In response to the user selecting the fourth region of the permanent memory, the controller retrieves the DTMF access code from the second region of the permanent memory, and the controller causes the radio to transmit the DTMF access code to access a DTMF telephone system. Following this, the user has access to the DTMF telephone system. The radio is then in a 'live dial' mode.

The second region of the permanent memory may contain a five-tone code for accessing a DTMF facility in a base station of the radio network. The controller may also be adapted to supply a connect tone to the user and to receive a telephone number entered by the user following transmission of the DTMF access code by the radio.

Although not essential to the invention, the fourth region and each of the third regions of the permanent memory can be made accessible by selection simply of an index number unique to that region. This index number is the 'Address book entry' number shown in the left column of FIG. 4. In operation of the radio then, the user would select the address of another portable or mobile radio by selecting an index number for one of the third regions and entering this through keypad 44. Similarly, the user could put the portable or mobile radio into a DTMF 'live dial' mode by selecting the index number for the fourth region and entering this through keypad 44.

Various further enhancements to the radio are possible.

The permanent memory may further comprise a fifth region, storing a further DTMF access code and a pointer value unique to the fifth region. The further DTMF access code is retrievable by selecting this pointer value unique to the fifth region. This fifth region is designed to operate together with one or more sixth regions of the memory. Each sixth region would store a telephone number and a pointer to the fifth region. Each sixth region of the permanent memory would be accessible to the user by activation of the user interface circuitry. Thus each sixth region would act as a storage area for a particular telephone number, which a user of the radio might wish to ring.

The controller would then be adapted to perform the following function:

in response to the user selecting one of the sixth regions of the permanent memory, the controller would retrieve the further DTMF access code from the fifth region as indicated by the pointer stored in the selected sixth region. The controller would then use the further DTMF access code in directing the radio to place a telephone call to the telephone number stored in the selected sixth region.

This is a different mode of telephone operation than that using the DTMF access code stored in the second region of the permanent memory. The controller used the DTMF code in the second region of memory to set the radio up to make a telephone call to a number which the user entered. However, in contrast, the further DTMF access code in the fifth region of the permanent memory combines with a pre-stored telephone number in one of the sixth regions of memory to place the whole telephone call automatically.

Each sixth region of the permanent memory can be made accessible by selection of an index number unique to that region.

FIG. 3 shows the fifth region of the permanent memory in its lowest row. The further DTMF access code is shown as digits 12345 and spaces for addition of a following telephone number. The pointer value of the fifth region of memory is '4'.

FIG. 4 shows two examples of the sixth kind of region of the permanent memory. These have index numbers 4 and 5 in the left column of FIG. 4. Each of these regions contains the pointer '4', which enables retrieval of the further DTMF access code from the fifth region of memory shown in FIG. 3. The two examples of the sixth regions of permanent memory contain different addresses, '12' and '89', indicating two different 'phone numbers which the radio can dial.

In operation therefore, the user can put the portable or mobile radio into a DTMF buffered dial mode and place a call to a particular stored telephone number by selecting the index number for the sixth region of the memory containing that particular telephone number. This sixth region of the memory also contains the pointer to the fifth region of the permanent memory.

The controller of the mobile or portable radio may be adapted to instigate a call to another radio or to a telephone number only after the user both selects one of the third, fourth or sixth regions in the permanent memory, and depresses a further key of the user interface circuitry. This further key would be, for example, an 'address send' key.

The user interface circuitry may be adapted to enable voice activation of some or all of the functions of the radio.

Normally, the entries in the permanent memory of the radio would be set up by a radio dealer. This would be prior to purchase of the radio, or during work on the radio by a radio dealer. The regions of the permanent memory may therefore be protected against alteration, whereby a dealer's customer programming software is required to overwrite or delete entries in these regions. However, it is also possible to merely password protect the regions of the permanent memory against alteration.

What is claimed is:

1. A mobile or a portable radio comprising:
 a) a controller;
 b) user interface circuitry, at least a portion of the user interface circuitry being activatable by the user;
 c) a permanent memory adapted to function as an address book, the permanent memory comprising:
  (i) one or more first regions, each first region for storing a predetermined message for transmission by the radio and a pointer value unique to that first region, whereby the message stored in any particular first region is retrievable by selecting the pointer value for that particular first region;
  (ii) a second region, the second region storing a DTMF access code and a pointer value unique to the second region, whereby the DTMF access code is retrievable by selecting the pointer value unique to the second region;
  (iii) one or more third regions, each third region for storing the address of another mobile or portable radio and a pointer value of one of the first regions, each third region of the permanent memory being accessible to a user of the mobile or portable radio by activation of the user interface circuitry;
  (iv) a fourth region, the fourth region storing the pointer value of the second region, the fourth region of the permanent memory being accessible to a user of the mobile or portable radio by activation of the user interface circuitry;
 d) the controller being adapted to perform the following functions:
  (i) in response to the user selecting one of the third regions of the permanent memory, the controller retrieves the predetermined message from the particular first region indicated by the pointer value stored in the selected third region, and the controller causes the radio to send the retrieved message to the mobile or portable radio identified by the address stored in the selected third region; and
  (ii) in response to the user selecting the fourth region of the permanent memory, the controller retrieves the DTMF access code from the second region of the permanent memory, and the controller causes the radio to transmit the DTMF access code to access a DTMF telephone system.

2. The mobile or portable radio of claim 1, wherein
the second region of the permanent memory contains a five-tone code for accessing a DTMF facility in a base station of the radio network and/or
the controller is adapted to supply a connect tone to the user and to receive a telephone number entered by the user following transmission of the DTMF access code by the radio.

3. The mobile or portable radio of claim 1, wherein
the fourth region and each of the third regions of the permanent memory are accessible by selection of an index number unique to that region,
whereby, in operation, the user can select the address of another portable or mobile radio by selecting an index number of one of the third regions, and the user can put the portable or mobile radio into a DTMF mode by selecting the index number of the fourth region.

4. The mobile or portable radio of claim 1,
e) wherein the permanent memory further comprises:
  (i) a fifth region, storing a further DTMF access code and a pointer value unique to the fifth region, whereby the further DTMF access code is retrievable by selecting the pointer value unique to the fifth region; and
  (ii) one or more sixth regions, each sixth region for storing a telephone number and a pointer to the fifth region, each sixth region of the permanent memory being accessible to the user by activation of the user interface circuitry; and
f) the controller being adapted to perform the following function:
 in response to the user selecting one of the sixth regions of the permanent memory, the controller retrieves the further DTMF access code from the fifth region as indicated by the pointer stored in the selected sixth region, and the controller causes the radio to place a telephone call to the telephone number stored in the selected sixth region.

5. The mobile or portable radio of claim 4, wherein each sixth region of the permanent memory is accessible by selection of an index number unique to that region, whereby, in operation, the user can put the portable or mobile radio into a DTMF buffered dial mode and place a call to a particular stored telephone number by selecting the index number of the sixth region of the memory containing that particular telephone number.

6. The mobile or portable radio of claim 4, wherein the controller is adapted to commence a call to another radio or to a telephone number only after the user both selects one of the third, fourth or sixth regions in the permanent memory, and depresses a further key of the user interface circuitry, for example an address send key.

7. The mobile or portable radio of claim 1, wherein the user interface circuitry is adapted to enable voice activation of some or all of the functions of the radio.

8. The mobile or portable radio of claim 1, wherein the regions of the permanent memory are protected against alteration, whereby customer programming software is required to overwrite or delete entries in the regions of the permanent memory.

9. The mobile or portable radio of claim 1, wherein the regions of the permanent memory are password protected against alteration.

10. The mobile or portable radio of claim 1, wherein the permanent memory is a non-volatile Electrically Erasable Programmable Read Only Memory (EEPROM).

* * * * *